May 19, 1959 — A. J. LEWUS — 2,887,525
ELECTRICAL WIRING APPARATUS
Filed Sept. 25, 1956
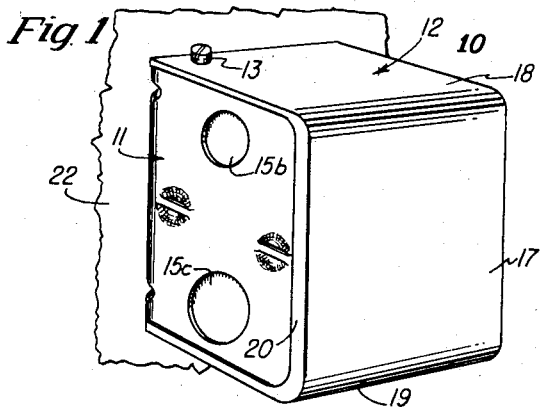
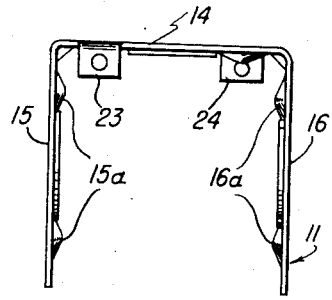
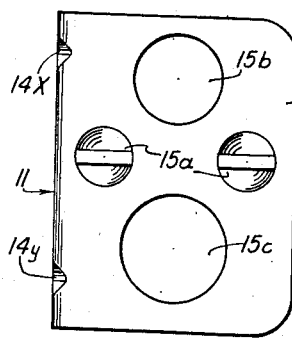
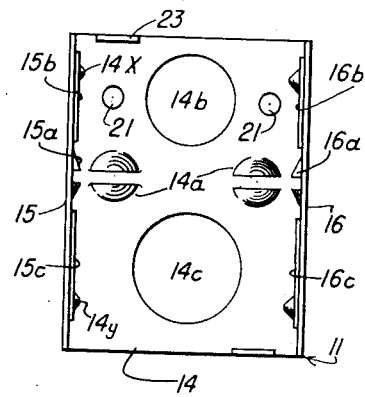
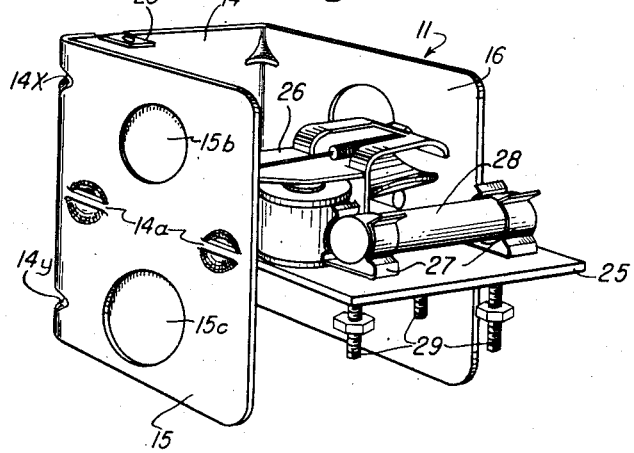
INVENTOR.
Alexander J. Lewus
BY
Smith, Olsen, Baird & Miller
Attys.

United States Patent Office 2,887,525
Patented May 19, 1959

2,887,525

ELECTRICAL WIRING APPARATUS

Alexander J. Lewus, Cicero, Ill.

Application September 25, 1956, Serial No. 611,879

2 Claims. (Cl. 174—52)

The present invention relates to electrical wiring apparatus, and more particularly to such wiring apparatus that is especially suited for use in the control circuits of single-phase induction motors of the split-phase or capacitor type.

A single-phase induction motor of the type noted usually comprises a stator having a main or run winding and an auxiliary or start winding, and a squirrel-cage rotor. In order to start a motor of this type, the run and start windings are connected to an associated source of single-phase alternating current; and thereafter, as the rotor approaches its full speed, the start winding is disconnected from the source. The ultimate acceleration of the rotor on into its full speed is accomplished by the run winding that is connected to the source. Subsequently, in order to arrest operation of the motor, the run winding is merely disconnected from the source.

One circuit control arrangement for a motor of the type noted comprises an electromagnetic relay of the current-responsive or marginal type that is provided with a field structure carrying a winding, an associated movable armature, and switch contacts controlled by the movements of the armature. The winding of the relay is connected in series circuit relation with the run winding of the motor and the switch contacts of the relay are connected in series relation with the start winding of the motor. In the arrangement, when the control circuit is initially closed, a heavy current traverses the winding of the relay and the series connected run winding of the motor, whereby the field structure of the relay attracts the armature effecting closure of the switch springs so that the start winding of the motor is energized. As the rotor of the motor is accelerated toward its full speed, the current traversing the winding of the relay and the run winding of the motor is reduced due to the corresponding increased impedance of the run winding of the motor, since the motor has a predetermined impedance-speed characteristic, the impedance of the run winding increasing with the speed of the rotor. The relay, being of the current-responsive or marginal type, responds to the reduced current traversing the winding thereof and the series connected run winding of the motor; whereby this current becomes insufficient to cause the field structure of the relay to retain the armature in its attracted position, when the rotor of the motor is accelerated to a predetermined speed toward its full speed. Thus at this time, the armature of the relay is released by the associated field structure effecting opening of the switch contacts so that the start winding of the motor is deenergized.

It is the general object of the present invention to provide composite wiring apparatus of improved and simple construction and arrangement and comprising a wiring box that houses a current-responsive relay of the character mentioned; which wiring box may be conveniently supported directly upon an electric motor of the character noted, or independently thereof; and which relay is included in the control circuit for the electric motor noted.

Another object of the invention is to provide electrical wiring apparatus of the chaarcter described; wherein the wiring box houses an insulating plate that is readily removable therefrom; wherein the plate carries a current-responsive relay on one side thereof and terminal structure on the other side thereof; and wherein the terminal structure accommodates ready wiring to the exterior of both the winding and the switch contacts of the relay, as well as the run and start windings of the motor.

Further features of the invention pertain to the particular arrangement of the elements of the electrical wiring apparatus, whereby the above-outlined and additional operating features thereof are attained.

The invention, both as to its organization and method of operation, together with further objects and advantages thereof, will best be understood by reference to the following specification taken in connection with the accompanying drawing, in which:

Figure 1 is a front perspective view of electrical wiring apparatus embodying the present invention;

Fig. 2 is a plan view of the base section of the wiring device;

Fig. 3 is a side elevational view of the base section of the wiring device;

Fig. 4 is a front elevational view of the base section of the wiring device; and Fig. 5 is a front perspective view of the wiring device, with the cover section thereof removed, and illustrating the insulating relay-supporting plate thereof, in its partially withdrawn position.

Referring now to the drawing, the electrical wiring device 10 there illustrated and embodying the features of the present invention is of substantially box-like form and comprises complementary base and cover sections 11 and 12 detachably secured together by a pair of screws 13. The base section 11 is formed of sheet metal (magnetic or non-magnetic) and is of one-piece construction and includes a rear wall 14 and a pair of opposed side walls 15 and 16 and having an open front; while the cover section 12 is formed of sheet metal (magnetic or non-magnetic) and is of one-piece construction and includes a front wall 17 and a pair of end walls 18 and 19 and having an open rear. In the cover section 12, the opposite sides of the walls 17, 18 and 19 are provided with narrow inwardly directed marginal flanges 20 that are adapted respectively to engage the side walls 15 and 16, when the cover plate 12 occupies its assembled position with respect to the base section 11. The rear wall 14 is provided with a pair of laterally spaced-apart holes 21 in the upper portion thereof that may be employed in mounting the base section 11 upon a suitable support, as indicated at 22 in Fig. 1. Also the top and bottom edges of the rear wall 14 respectively carry forwardly projecting tabs 23 that are arranged to receive the screws 13; and the end walls 18 and 19 are provided with aligned holes therethrough through which the screws 13 may be extended.

The desired rigidity in the base section 11 is achieved not only by appropriate selection of the gauge of the sheet metal from which it is formed, but also by the provision of upper and lower inwardly directed dimples 14x and 14y in the corners between the rear wall 14 and the respective side walls 15 and 16. This arrangement establishes a substantially parallel relationship between the opposed side walls 15 and 16.

The intermediate portion of the rear wall 14 is provided with a pair of laterally spaced-apart and aligned guide members 14a; and likewise, the intermediate portions of the side walls 15 and 16 are respectively provided with pairs of longitudinally spaced-apart and aligned guide members 15a and 16a; which guide members 14a, 15a and 16a are also arranged in alignment with respect to each other and are adapted to receive an insulating plate 25, as illustrated in Fig. 5. More particularly, the insulating plate 25 may be formed of "Bakelite," or the like, and is substantially square in plan so that any one of the four corresponding edges thereof may be located at the front of the base section 11 when the other three corresponding edges thereof respectively engage the guide members 15a, 14a and 16a.

The plate 25 carries on one side thereof an electromagnetic relay 26 and a pair of laterally spaced-apart fuse clips 27, as well as a cartridge fuse 28 removably arranged in the fuse clips 27; and also the plate 25 carries on the other side thereof a plurality of electrical terminals 29; which electrical apparatus 26 and 27 are suitably connected to the electrical terminals 29 by local electrical connections, not shown, extending through the plate 25. Accordingly, it will be understood that when the plate 25 is arranged in supported position within the base section 11, it divides the interior thereof into two adjacent cells, one of the cells receiving the electrical apparatus 26, 27 and 28, and the other of the cells receiving the terminals 29. In this connection, it is also mentioned that the plate 25 may be placed within the base section 11 in either a normal position with the electrical apparatus 26, 27 and 28 at the top, or in an inverted position with the electrical apparatus 26, 27 and 28 at the bottom.

Further: first knock-out elements 14b, 15b and 16b are respectively formed in the upper portions of the walls 14, 15 and 16; and second knock-out elements 14c, 15c and 16c are respectively formed in the lower portions of the walls 14, 15 and 16; and in the arrangement, the knock-out elements 14b, 15b and 16b may be of ½" size, while the knock-out elements 14c, 15c and 16c may be of ¾" size. As previously explained, the insulating plate 25 may be placed within the base section 11 in either a normal position or an inverted position; whereby the terminals 29 respectively project either into the lower cell or into the upper cell, as indicated in Fig. 5. Accordingly, an appropriate one or more of the knock-out elements 14c, etc., or an appropriate one or more of the knock-out elements 14b, etc., depending upon the position of the insulating plate 25 and the wiring required, may be removed so as to accommodate the extension of external wiring to the terminals 29 through the corresponding one of the cells in the base section 11.

As previously noted, the base section 11 may be mounted either directly upon the frame of the electric motor, or independently thereof, in an obvious manner; and the electromagnetic relay 26 is employed in the start circuit of the electric motor in a well-known manner and in the general manner disclosed in U.S. Patent No. 2,547,131, granted on April 3, 1951, to Alexander J. Lewus; which elements are not illustrated in the interest of brevity.

In the operation of the electric motor, ready access may be obtained to the electromagnetic relay 26 and to the fuse 28 by removal of the cover section 12 with respect to the base section 11 upon removal of the two screws 13. Furthermore, in connection with the mounting of the base section 11, it is pointed out that there is really no normal position thereof, whereby it may be mounted so that the insulating plate 25 is placed thereinto in a horizontal position, in a vertical position, or in some angular position with respect to the horizontal and vertical planes.

In view of the foregoing, it is apparent that there has been provided electrical wiring apparatus of improved and simplified construction and arrangement that is especially suited for use in the control circuits of single-phase induction motors of the split-phase or capacitor type.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In combination, a wiring box comprising complementary base and cover sections detachably secured together, said base section being U-shaped and of one-piece sheet metal construction and including a rear wall and a pair of opposed side walls and having an open front, said cover section being U-shaped and of one-piece sheet metal construction and including a front wall and a pair of opposed end walls and having an open rear, an insulating plate adapted to be placed and removed with respect to the interior of said base section through the open front thereof when said cover section is removed from said base section, means including a pair of aligned guide members respectively carried by the intermediate portions of said side walls and respectively receiving the opposed sides of said plate for holding said plate in place within said base section so that it is substantially normal to said rear wall and to said side walls and so as to divide the interior of said base section into two adjacent cells, said base section being provided with inwardly extending deformations along the respective meeting edges of said rear and side walls to stiffen said base section and thereby to maintain said guide members in alignment for receiving said insulating plate thereon, electrical apparatus carried by said plate and mounted upon one side thereof, electrical terminals carried by said plate and mounted upon the other side thereof, electrical connections carried by said plate and extending therethrough between said apparatus and said terminals, whereby said plate may be placed within said base section in a first position with said apparatus in one of said cells and with said terminals in the other of said cells and whereby said plate may be placed within said base section in a second position with said apparatus in said other cell and with said terminals in said one cell, a first knock-out element arranged in one end of one of said walls and removable to provide an opening into said one cell so as to accommodate the extension of external wiring to said terminals in the event they are disposed in said one cell, and a second knock-out element arranged in the other end of one of said walls and removable to provide an opening into said other cell so as to accommodate the extension of external wiring to said terminals in the event they are disposed in said other cell.

2. The combination set forth in claim 1, wherein said plate is substantially square so that any one of the four edges thereof may be located adjacent to the open front of said base section when said plate is placed within said base section in either of its positions.

References Cited in the file of this patent

UNITED STATES PATENTS

| 1,906,669 | Thomas | May 2, 1933 |
| 1,971,908 | Fullman | Aug. 28, 1934 |
| 2,420,184 | Mekelburg | May 6, 1947 |
| 2,596,043 | Piker | May 6, 1952 |
| 2,762,987 | Mackey | Sept. 11, 1956 |

FOREIGN PATENTS

| 585,914 | Great Britain | Feb. 28, 1947 |
| 889,620 | Germany | Sept. 10, 1953 |